Nov. 23, 1943.   H. MJOLSNESS   2,334,946
COMBINED THRESHER AND GRAIN CLEANER
Filed July 15, 1940   4 Sheets-Sheet 1

INVENTORS
HAAKON MJOLSNESS (DECEASED)
BY- OLGA A. MJOLSNESS (ADMINISTRATRIX)
& NEIL W. RUSSELL

Howard L Fischer
Attorney

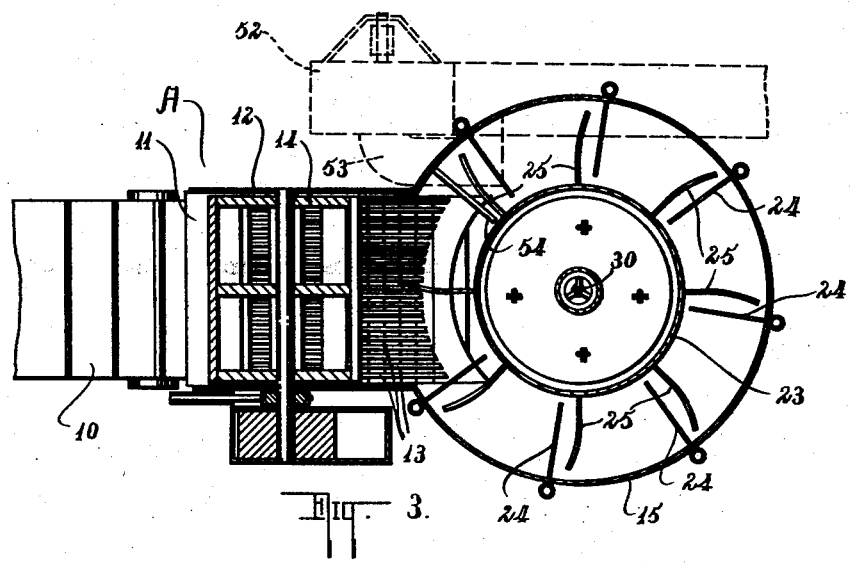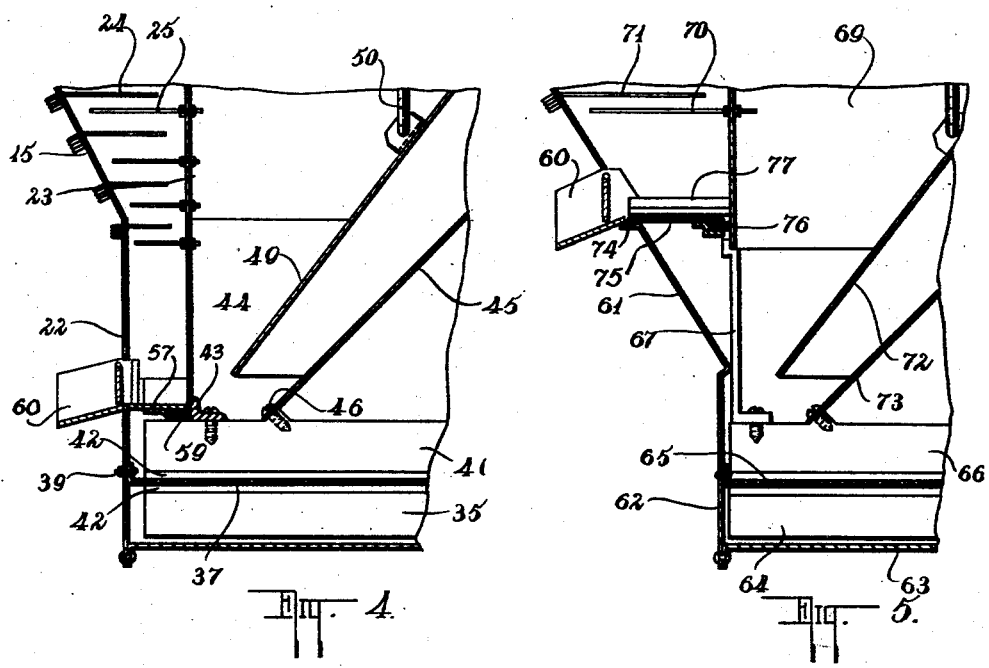

Nov. 23, 1943.  H. MJOLSNESS  2,334,946
COMBINED THRESHER AND GRAIN CLEANER
Filed July 15, 1940  4 Sheets-Sheet 3
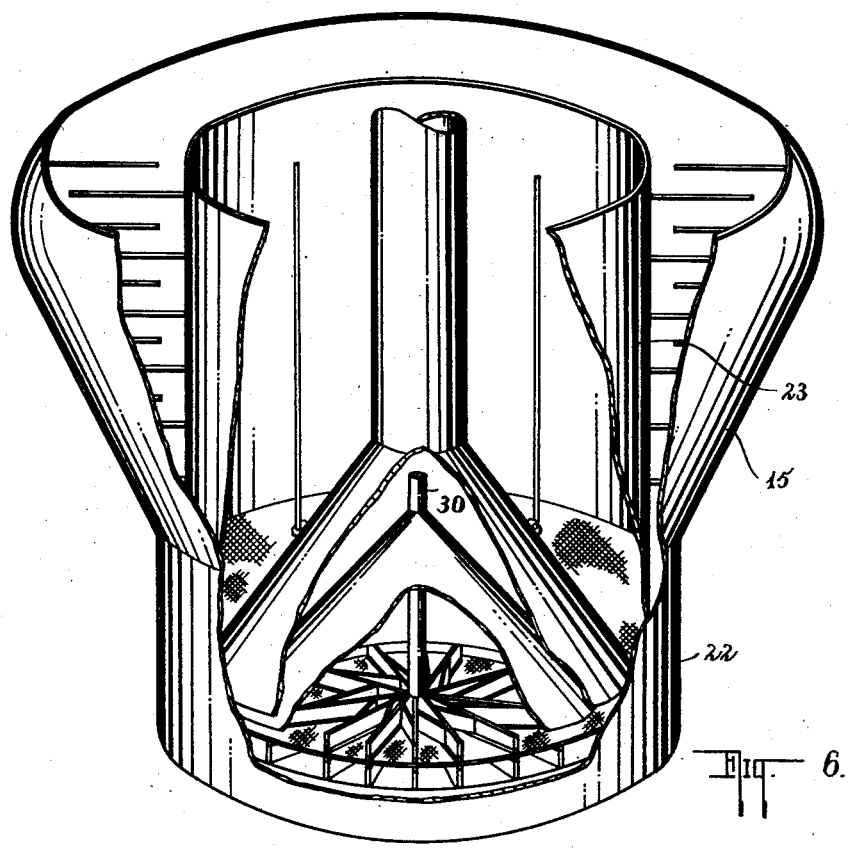
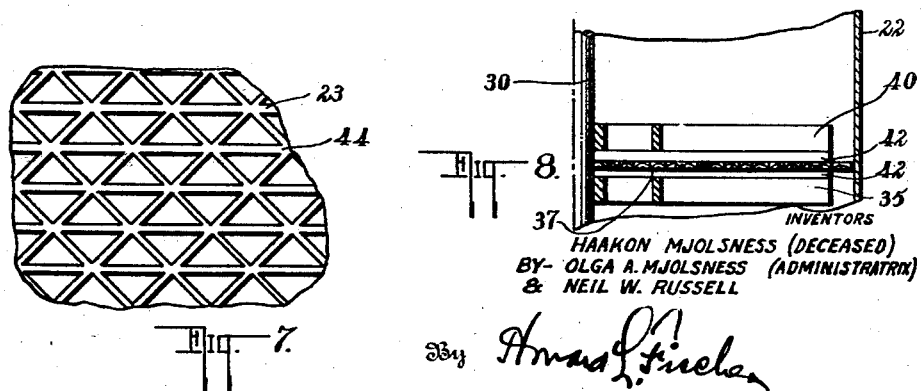
INVENTORS
HAAKON MJOLSNESS (DECEASED)
BY- OLGA A. MJOLSNESS (ADMINISTRATRIX)
& NEIL W. RUSSELL
Attorney

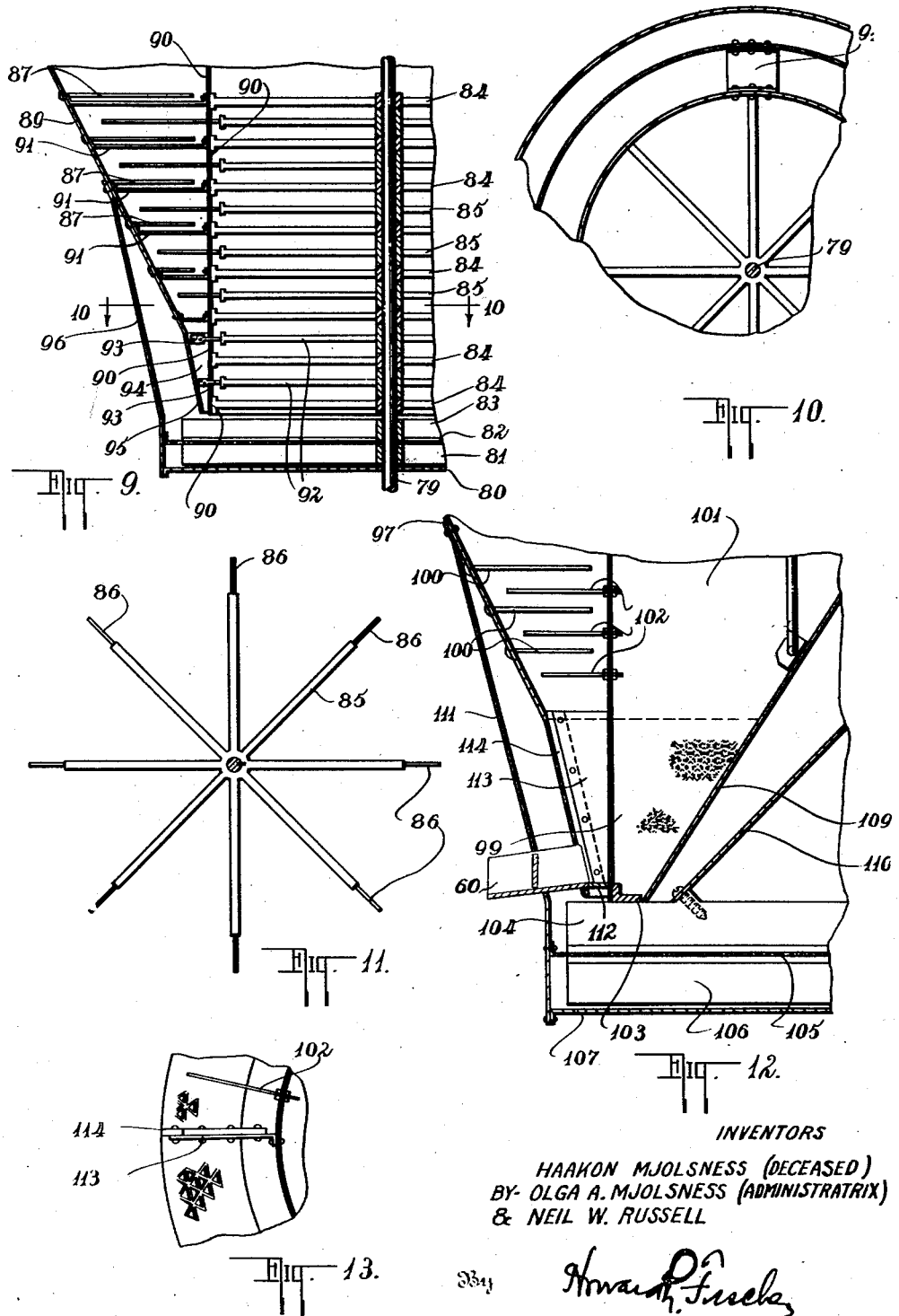

Patented Nov. 23, 1943

2,334,946

UNITED STATES PATENT OFFICE 2,334,946

COMBINED THRESHER AND GRAIN CLEANER

Haakon Mjolsness, deceased, late of Minneapolis, Minn., by Olga A. Mjolsness, administratrix, Minneapolis, Minn., and Neil W. Russell, Minneapolis, Minn., assignors of one-tenth to Haaky Manufacturing Company, St. Paul, Minn., a corporation of Minnesota Application July 15, 1940, Serial No. 345,682

13 Claims. (Cl. 130—23)

Our invention relates to an improvement in combined thresher and grain cleaner, wherein it is desired to provide a single device for threshing, cleaning, and separating grain from foreign materials.

Various types of grain cleaning devices have been made which could be used in conjunction with a threshing machine. However, because such machines are not ordinarily designed particularly for use in conjunction with threshers, it has been formerly necessary to pass the grain through a complete threshing operation and then a complete cleaning operation, both devices performing their functions in their usual manner without any particular cooperation between the two devices with the exception that the thresher delivers grain to the cleaner.

It is an object of the present invention to conduct the straw discharged from the threshing cylinder into an area surrounding a rotating cylinder or shaft. In this area the straw is agitated by a series of agitating fingers cooperating with a series of stationary fingers; and the straw is rotated by the agitating fingers into the entrance of a straw fan which picks up the straw and forces it away from the thresher.

It is a further purpose of the present invention to deliver the grain and seeds threshed by the cylinder to an area surrounding the rotary cylinder mentioned above, and to screen these seeds and grain to separate the same from the tailings. The seeds and grain, together with small bits of dust, straw and chaff pass through the screen, while the tailings are not permitted to pass through the screen, and are delivered to a suitable tailings spout.

It is an object of the present invention to provide an aspirating device in the path of the material passing through the screen. Dust and small particles of chaff pass through the screen with the grain and seeds; and the aspirating means removes the foreign particles, leaving only the seeds and grain. In this manner a highly concentrated grain is produced which contains virtually no foreign material.

It is a further purpose of our invention to provide a seed screen in the path of the grain and seeds after the aspiration thereof. The seeds may thus be separated from the grain, the grain and seeds being discharged through separate troughs or delivery chutes. After this separation, the grade of the grain is extremely high, and commands a higher price than other grain containing seeds and foreign material.

These and other objects and novel features of our invention will be more clearly set forth in the following specification and claims.

In the drawings forming a part of our specification:

Figure 3 is a transverse sectional view, the position of the section being indicated by the line 3—3 of Figure 2.

Figure 4 is a sectional view through a portion of the separating mechanism, enlarged to show the detail thereof.

Figure 5 is a sectional view similar to Figure 4, showing a modified form of construction of the separating means.

Figure 6 is a side elevational view of the separating mechanism, portions thereof being broken away to show the construction thereof.

Figure 7 is an enlarged detail view of the type of screen used for separating the grain from the tailings.

Figure 8 is a sectional detail showing the grain agitating means and their relation to the seed screen.

Figure 9 is a sectional view similar to Figures 4 and 5, showing a modified form of construction.

Figure 10 is a diagrammatic transverse section of the modification illustrated in Figure 9, the position of the section being indicated by the line 10—10 of Figure 9.

Figure 11 is a plan view of one of the agitator finger supports for the rotary agitator fingers.

Figure 12 is a sectional view similar to Figures 4, 5 and 9, showing still another form of construction.

Figure 13 is a sectional view of a portion of the construction shown in Figure 12, the position of the section being indicated by the line 13—13 of Figure 12.

Figure 1:
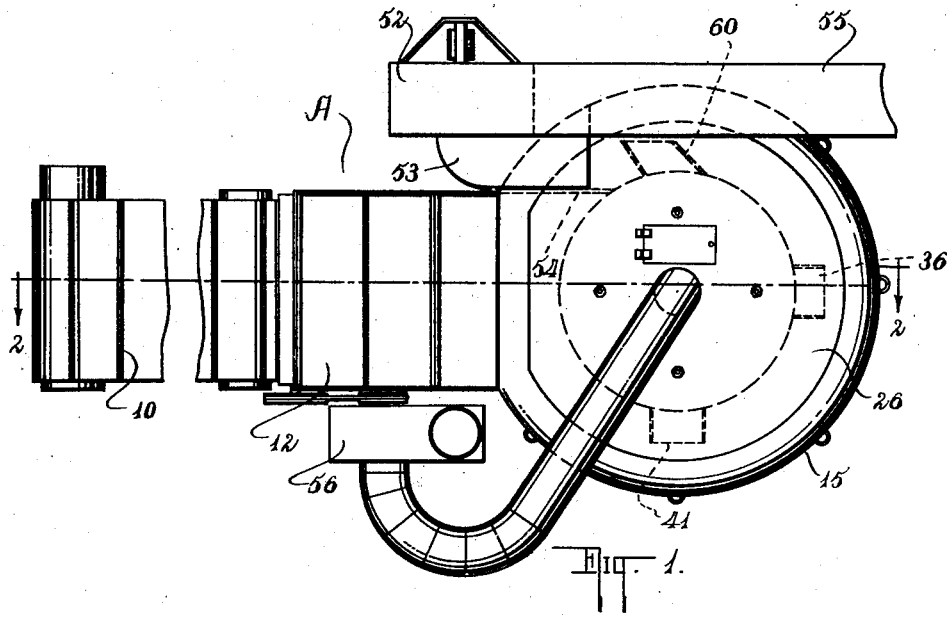
Figure 1 is a top plan view of our combined thresher and grain cleaner, illustrating the general construction, but showing no support therefor.

Our combined thresher and grain cleaner, illustrated diagrammatically in the drawings, and indicated by the letter A, is designed for mounting upon a movable base, so that it can be readily moved from place to place. The manner in which this device can be mounted is not shown in the drawings, as any convenient type of base may be used, and any manner of mounting the base upon wheels may be employed.

The thresher arrangement is shown diagrammatically, as the details of this construction are not most important in the present construction. We disclose a grain delivery belt 10, designed to deliver unthreshed grain to the entrance opening 11 of the thresher housing 12. The grain travels over the series of spaced fingers 13 sometimes known as the concave; and passes beneath and through the threshing cylinder 14. The major portion of the grain is threshed by this cylinder 14, and the straw is passed to the separating unit.

The grain threshed by the cylinder 14 passes between the spaced fingers forming the concave 13, while most of the straw is carried by these fingers and delivered into the substantially funnel-shaped casing 15 of the separating device. The grain drops upon the shaker pan 16 which is rocked or shaken by a suitable means such as the eccentric 17 upon the transverse shaft 19. The shaker pan is rockably mounted upon links 20 pivotally secured at 21 to the frame. The grain moves gradually down the shaker pan 16, and drops into the area between the lower cylindrical wall 22 of the casing 15 and the rotatable cylinder 23.

A series of spring agitator fingers 24 are supported at one end to the casing 15, and extend inwardly therefrom, terminating in spaced relation from the rotatable cylinder 23. Upon the cylinder 23 are mounted outwardly extending agitator fingers 25 which terminate in spaced relation to the outer casing 15. The fixed fingers 24 are out of the path of movement of the fingers 25 on the cylinder 23, so that the cylinder may rotate, the fingers 25 extending between the fixed spring fingers 24.

Figure 2:
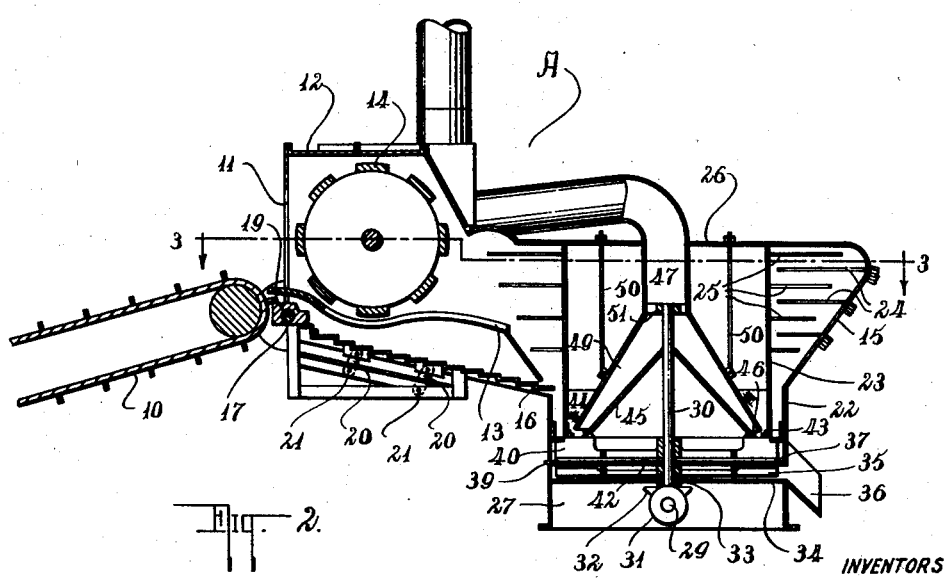
Figure 2 is a longitudinal sectional view of our combined thresher and grain cleaner, the position of the section being indicated by the line 2—2 of Figure 1.

The upper edge of the funnel-shaped housing 15 curves inwardly as shown in Figures 2 and 6, and is provided with a removable top 26. A gear compartment 27 is mounted in the lower end of the casing or housing 15, to transmit rotary movement of the horizontal drive shaft 29 to rotary movement of the vertical shaft 30. In Figure 2 of the drawings, the bevel gear 31 on the horizontal shaft 29 is shown driving the bevel gear 32 on the vertical shaft 30, to transmit rotary movement thereto.

The vertical shaft is supported upon suitable bearings, such as the bearing 33, and extends through the transverse floor 34 above the bevel gears 31 and 32. An agitator spider 35 is mounted upon the shaft 30 for rotation therewith, and agitates the seeds dropping upon the floor 34, moving the same toward the seed spout 36. A seed screen 37 is transversely mounted above the agitator spider 35, and may be supported thereby, a pin 39 or other means extending through the housing 15 to keep the screen from rotation. A second agitator 40 is mounted upon the shaft 30 for rotation therewith, and is positioned above the seed screen 37 to move the seeds and grain over the surface of the screen 37 and to move the grain toward the grain spout 41.

The spiders or agitators 35 and 40 are provided with wooden or fiber bearing portions 42 which may engage the surface of the screen 37, and these bearing portions 42 prevent a metal to metal contact between the agitators and the screen. The bearing portions wear with use, but may be easily replaced at much lower cost than would be entailed in replacing the screen.

A metal ring 43 is secured to the upper surface of the agitator 40, as best illustrated in Figures 2 and 4 of the drawings. The cylinder is perforated to form a screen 44 near the lower extremity of the same. The preferred form of perforation is best illustrated in Figure 7 of the drawings, in which a small section of the screen 44 is shown. The cylinder 23 is thus driven by the agitator 40 from the central shaft 30.

A lower conical shield 45 is also secured to the upper surface of the agitator 40, this shield being held in place by means of bolts 46. The shield 45 may be secured to the shaft 30, to reinforce the agitator connection therewith if desired. This shield 45 forms the bottom of an air passage through which the chaff and dust is separated from the grain and seeds.

Projecting through the top 26 I provide a tubular conduit 47 which extends downwardly concentrically with the cylinder 23 and the shaft 30. To the bottom of this conduit I attach a second conical shield 49 spaced above the first shield 45. To assist in the support of the second shield 49, tie rods 50 may depend from the top 26, which tie rods are secured to the second conical shield 49. A bearing 51 may be provided within the conduit 47 to assist in supporting the upper end of the shaft 30.

A fan 52 is secured by a conduit 53 to the side of the housing 15 adjacent the housing 12 of the threshing device. A partition wall 54 extends inwardly from the housing 15 adjacent the point of entrance of the straw from the thresher. The cylinder 23 rotates in a direction to carry the straw and grain around the entire circumference of the housing 15 before the straw is stopped from further rotation by the partition wall 54. This wall is provided with slots therein to permit the rotary fingers 25 to pass therethrough. An exhaust conduit 55 is connected to the fan 52, and the straw and foreign material removed from the casing is forced through this exhaust conduit in any desired direction.

The tubular conduit 47 is connected to a fan 56 which causes an upward draft of air through the grain and seeds in the lower extremity of the cleaner. As the seeds, grain, and dust pass through the screen 44, they are subjected to an upward draft of air which removes the light particles, and draws the same up through the tubular conduit 47, after passing between the conical shields 45 and 49.

In order to prevent the seeds and grain from dropping directly upon the seed screen 37, I provide a ring-shaped baffle or floor 57 upon which these seeds and the grain may drop. A sealing element 59 on the ring 57 prevents the seeds and grain from flowing between the ring 57 and the cylinder, making it necessary for the seeds and grain to pass through the screen 44 to drop onto the seed screen 37.

The operation of my device is believed clear from the foregoing description. The straw is delivered to the upper portion of the housing 15 and is further broken up by the intermeshing fingers 24 and 25. The grain and seeds are delivered by the shaker pan 16 into the cylindrical space between the cylindrical portion 22 of the housing 15 and the screen 44. Any grain not removed from the straw in the threshing operation also drops into this portion of the device. The grain and seeds drop through the screen 44 while the remainder of the material is carried about the cylinder and is withdrawn therefrom through the tailings spout 60. This spout 60 extends into the chamber between walls 22 and cylinder 23 above the ring 57. Most of the straw and other material are removed by the straw fan 52 and forced out through the conduit 55.

In Figure 5 of the drawings, I disclose a modified form of construction. In this construction the housing 61 is substantially funnel-shaped and is provided with a cylindrical portion 62 near the bottom thereof. A floor 63 provdes a base upon which the seeds may be gathered. These seeds may be forced through a suitable seed spout similar to the spout 36 illustrated in Figure 1 by means of the agitator 64. A seed screen 65 is positioned between the agitator 64 and the grain agitator 66 which tends to force the grain on the surface of the screen 65 toward the grain spout such as 41 illustrated in Figure 1.

A series of circumferentially spaced brackets or legs 67 form a support for a rotatable cylinder 69. This cylinder has agitator fingers 70 thereupon which are similar to the previously described fingers 25 and which cooperate with the fingers 71 similar to the fingers 24. Spaced conical shields 72 and 73 within the cylinder 69 provide a path for air for the aspiration process. These conical shields are identical to the shields 49 and 45 which have been previously described.

An outwardly bulged ring 74 is provided in the tapered portion of the casing 61 to support a horizontal ring-shaped screen 75. This screen is provided with a sealing means 76 on the inside margin of the same to prevent seeds and grain from passing between the inner edge of the screen 75 and the cylinder 69. Agitator paddles 77 are mounted upon the cylinder 69 and move over the screen 75 to agitate grain and seeds resting thereupon. The seeds and grain pass through the screen 75, while the material not passing through this screen is rotated by the paddle 77 to a suitable tailings spout similar to the spout 60 illustrated in Figure 1.

In Figures 9 and 10 of the drawings, I disclose a modified form of construction. In this form a vertical shaft 79 extends upwardly from a suitable drive mechanism not illustrated in the drawings. A floor 80 is provided through which the shaft 79 extends, and an agitator 81 is mounted on the shaft to rotate therewith over this floor. The agitator 81 acts to agitate seeds resting upon the floor 80 and to urge the same toward a suitable seed spout similar to the spout 36 illustrated in Figure 1 of the drawings.

A seed screen 82 is mounted transversely above and parallel the floor 80 and an agitator 83 is mounted for rotation upon the shaft 79 above this seed screen. The agitator 83 is designed to move seeds and grain over the surface of the screen 82 and to urge the grain toward a suitable grain spout such as 41 in Figure 1 of the drawings.

Mounted on the shaft 79 above the agitator 83, I provide a series of supporting spiders 84 which are rotatable with respect to the shaft 79. Alternately positioned with respect to the bearing spiders 84, I provide agitator spiders 85, which are best illustrated in Figure 11 of the drawings. The agitator spiders 85 are provided with agitator fingers 86 on the end of the spider arms which are designed to intermesh with spring fingers 87 extending inwardly from the funnel-shaped casing 89.

Mounted at the outer extremity of each of the spiders 84, I provide a ring 90. These rings 90 are supported by the bearing spiders 84 and are all of the same diameter, forming in effect a single cylindrical wall having a series of circumferential slots therein. The rings 90 are held from rotation with the shaft 79 by means of brackets 91 which connect each ring 90 with the outer casing 89.

Between the two lowermost pairs of bearing spiders 84, I provide spiders 92 which are equipped with fingers 93 at the ends thereof, which support paddles 94. The paddles 94 extend in a generally vertical direction and rotate with the shaft 79 between the lowermost rings 90 and the outer surface of the funnel-shaped casing 89.

The lower portion of the housing 89 is perforated as shown at 95 to permit seeds and grain to drop therethrough. Thus as the paddles 94 rotate, the material between the lowermost rings 90 and the lower portion of the casing 89 which is perforated as shown at 95, is screened and the seeds and small grain are permitted to drop upon the seed screen 82. An outer casing wall 96 is provided encircling the lower portion of the casing 89 to enclose the screen portion 95. The horizontal screen 82 and the floor 80 are connected to this outer casing wall 96. At a suitable point in the periphery of the screen 95, this screen is broken away so that the remaining material between the screen 96 and the rings 90 may be delivered to a suitable tailings spout.

In Figures 12 and 13 of the drawings, I disclose still another form of construction. In this form the casing wall 97 which is of a substantially funnel shape is provided with a lower perforated screen portion 99. Above the perforated portion 99, spring fingers 100 extend inwardly. A rotatable cylinder 101 is mounted within the casing 97, and spring agitator fingers 102 intermeshing with the fingers 100 are mounted on this cylinder.

The cylinder 101 is secured by means of a ring 103 to an agitator 104 which rotates over a seed screen 105. A second agitator 106 rotates beneath the screen 105 and over the floor 107. The agitator 106 tends to urge seeds on the floor 107 toward a suitable seed spout such as is illustrated at 36 in Figure 1. The agitator 104 tends to move seeds and grain over the surface of the screen 105 and toward a grain spout such as 41 illustrated in Figure 1. A pair of conical shields 109 and 110 provide an air passage therebetween, by means of which the grain may be aspirated.

An outer casing wall 111 is secured to the casing 97 and encircles the lower portion thereof. The seed screen 105 and the floor 107 are marginally secured to this outer casing wall 111. At a suitable point in the periphery of the casing 97, the lower portion of this casing is cut away to permit the remaining material between the casing 97 and the cylinder 101 to pass through a tailings spout such as the spout 60 shown in Figure 1. A flooring 112 is provided in the shape of a ring at the lower extremity of the casing 97 which fits closely about the revolving cylinder 101.

Paddles 113 having resilient scraping edges 114 thereupon are mounted in angularly spaced relation to the outer surface of the cylinder 101. These paddles and the scraping edges 114 thereof move over the surface of the lower perforated portion 99 of the casing 97 and tend to move material between this casing or housing and the cylinder 101 toward the tailings spout.

The manner of operation of the various types of our combined threshers and grain cleaners is believed obvious from the foregoing description. The positions of the various outlet spouts may be changed to suit individual requirements. In each case the straw entering the casing is more thoroughly agitated by the two sets of intermeshing fingers, and any grain remaining therein is removed. The straw is withdrawn by a straw fan and larger particles of foreign material are free to pass through the tailings spout. The seeds and grain fall through a screen which separates them from the tailings, and the seeds are separated from the grain by a suitable horizontal seed screen.

In accordance with the patent statutes, we have described the principles of construction and operation of our combined thresher and grain cleaner; and while we have endeavored to set forth the best embodiments thereof, we desire to have it understood that these are only illustrative of ways of carrying out our invention, and that obvious changes may be made within the scope of the following claims without departing from the spirit of our invention.

We claim:

1. In combination with a harvesting machine, a funnel-shaped casing for receiving straw from the harvesting machine, a cylindrical shell within said casing, means rotatably supporting said shell substantially axially of said casing, a series of fingers extending outwardly from said cylinder, a series of inwardly extending fingers on said casing intermeshing with said fingers extending outwardly from said shell, the lower portion of said shell being perforated to provide a screen through which grain may pass, and blower means connected to said casing adjacent the top thereof to draw the straw upwardly and out of said casing.

2. In combination with a grain harvesting device, an outer casing, a rotatable hollow cylinder within said casing and mounted to provide a substantially ring-shaped chamber between said casing and cylinder, a series of inwardly extending fingers on said casing, a series of outwardly extending fingers on said cylinder intermeshing with said inwardly extending fingers, substantially vertical means rotatably supporting said cylinder and outwardly extending fingers, said cylinder being perforated near its lower end to permit the grain within said ring-shaped chamber to drop therethrough.

3. A grain cleaning device in combination with a threshing device comprising a substantially funnel-shaped casing having a substantially vertical axis, a concentric hollow rotatable cylinder within said casing, said casing having a straw inlet near the top thereof, straw breaking means between said casing and said cylinder, a screen forming the lower part of said cylinder through which seeds and grain may pass, a grain support beneath said screen for supporting grain which has passed through said screen, and blower means connected to the top of the casing for drawing the straw upwardly and out of said casing.

4. A grain cleaner comprising a substantially funnel-shaped casing, a vertical rotatable shaft in, and concentric with, said casing, a series of radially extending fingers secured for rotation together with said shaft, a series of rings of equal diameter spaced one above the other between each series of fingers and concentric with said shaft, means on said casing holding said rings from rotation, and a series of inwardly projecting fingers on said casing cooperable with said fingers on said shaft for agitating straw between said rings and said casing.

5. A grain cleaning device comprising a substantially funnel-shaped casing, a vertical rotatable shaft within said casing and substantially concentric therewith, a series of radially extending fingers secured for rotation with said shaft, a series of inwardly extending fingers on said casing cooperating with said radially extending fingers to hull grain from the straw, a baffle means concentric with and encircling the shaft for holding the grain between said baffle and said casing, a screen at the bottom of said casing forming a part of the baffle means through which grain may pass, supporting means beneath said screen within said casing on which said grain passing through said screen may fall, and blower means connected to the casing adjacent the upper end thereof for drawing straw from said casing.

6. A grain cleaner comprising a substantially funnel-shaped casing, a series of radially inwardly extending fingers on said casing, a vertical rotary shaft within said casing and substantially concentric therewith, a series of radially extending fingers rotatable with said shaft cooperable with said first named fingers to break up straw, cylindrical baffle means encircling said shaft and concentric therewith for confining the straw and grain between said baffle means and said casing, a screen forming a part of the baffle means and positioned at the base of said casing through which grain may pass, and a grain support below the level of said screen to catch the grain passing through said screen.

7. A grain cleaning device comprising a funnel-shaped casing, a vertical shaft within said casing, a cylindrical baffle concentric with the shaft and encircling the same confining straw and grain between said baffle and said casing, a screen forming a part of the baffle through which grain may pass, and cooperable means on said casing and said baffle for agitating straw therebetween.

8. A grain cleaning device comprising a casing, a vertical shaft within said casing, a baffle secured to said shaft for rotation therewith forming a substantially ring-shaped chamber between said casing and said baffle, said baffle and said chamber having contacting relation at the lower end of said chamber to prevent material from passing therebetween, a screen forming a part of the wall of said chamber at the lower extremity thereof, and a blower connected to the upper end of said casing in communication with said ring-shaped chamber for drawing straw from said chamber.

9. A grain cleaning device to receive grain and straw from a threshing machine, said device comprising an outer casing, a rotatable cylinder having a substantially vertical axis supported within said casing and mounted to provide a substantially ring-shaped chamber between said casing and cylinder, cooperable means on said casing and said baffle for agitating straw therebetween, a flat ring-shaped screen element through which grain may pass forming the bottom of said ring-shaped chamber and extending from the outer casing to the cylindrical surface of the cylinder, said screen element holding the straw from dropping below said ring-shaped chamber, and suction means connected to the casing at the upper end thereof for drawing straw from the ring-shaped chamber.

10. A grain cleaning device comprising a casing, a vertical shaft within said casing, a rotatable cylinder within said casing secured to said shaft for rotation therewith, forming a ring-shaped chamber between said casing and said cylinder, cooperable means on said casing and said baffle for agitating straw therebetween, a ring-shaped screen element extending inwardly from the casing to the outer surface of the cylinder near the lower end thereof through which grain may pass, said screen forming the bottom of the ring-shaped chamber and holding the straw from dropping below said ring-shaped chamber, and said cylinder extending through said ring-shaped screen, and suction means connected to said casing at the upper end thereof for drawing straw from said ring-shaped chamber.

11. A grain cleaning device arranged to receive straw, grain, and seeds, the device comprising an outer casing, a rotatable baffle within said casing designed to provide a ring-shaped chamber between said casing and said baffle, said baffle being rotatable on a substantially vertical axis, straw agitating means between said casing and said baffle, a screen through which grain may pass forming a part of the wall of said chamber at the lower extremity thereof and closing the lower end of said ring-shaped chamber, said casing having a straw inlet therethrough into said chamber, suction means and a conduit from said suction means to said casing in communication with said chamber, said conduit communicating with said casing in angularly spaced relation to said inlet in the direction of rotation of said baffle, said conduit acting to receive straw carried toward the conduit by rotation of said baffle.

12. A grain cleaning device in combination with a threshing machine, the device comprising an outer casing, a straw inlet near the top of said casing at one side thereof, a baffle rotatable on a substantially vertical axis within said casing defining a ring-shaped chamber between said baffle and said casing, suction means, an air conduit means connecting said suction means with said casing near the top thereof and angularly spaced from said inlet, said baffle rotating in a direction to carry straw from said inlet toward said conduit, means on said baffle to move straw toward said conduit, and means at the bottom of said ring-shaped chamber for removing grain therefrom while retaining the straw therein.

13. A grain cleaning device in combination with a threshing machine, the device comprising an outer casing, a straw inlet near the top of said casing at one side thereof, a baffle rotatable in a substantially vertical axis within said casing defining a ring-shaped chamber between said baffle and said casing, suction means, an air conduit means connecting said suction means with said casing near the top thereof and angularly spaced from said inlet, said baffle rotating in a direction to carry straw from said inlet toward said conduit, means on said baffle to move straw toward said conduit, baffle means between the air conduit and said inlet between said casing and said rotatable baffle to prevent straw from being carried past said conduit, and means at the bottom of said ring-shaped chamber for removing grain therefrom while retaining the straw therein.

OLGA A. MJOLSNESS.
*Administratrix of the Estate of Haakon Mjolsness, Deceased.*
NEIL W. RUSSELL.